(12) United States Patent
Erickson et al.

(10) Patent No.: US 6,900,998 B2
(45) Date of Patent: May 31, 2005

(54) VARIABLE-SPEED WIND POWER SYSTEM WITH IMPROVED ENERGY CAPTURE VIA MULTILEVEL CONVERSION

(75) Inventors: Robert W. Erickson, Boulder, CO (US); Osama A. Al-Naseem, Safat (KW); Lee Jay Fingersh, Westminster, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 10/452,570

(22) Filed: May 30, 2003

(65) Prior Publication Data

US 2004/0022081 A1 Feb. 5, 2004

Related U.S. Application Data

(60) Provisional application No. 60/384,637, filed on May 31, 2002.

(51) Int. Cl.[7] .............................. H02M 5/22; H02P 9/48
(52) U.S. Cl. .......................................... 363/159; 290/44
(58) Field of Search .......................... 363/34, 157, 159, 363/163, 164; 290/43, 44, 54, 55; 322/29, 32

(56) References Cited

U.S. PATENT DOCUMENTS

| | | | |
|---|---|---|---|
| 4,642,751 A | 2/1987 | Schauder | |
| 4,648,022 A | 3/1987 | Schauder | |
| 4,994,684 A | 2/1991 | Lauw et al. | |
| 5,798,632 A | 8/1998 | Muljadi | |
| 5,949,672 A | * 9/1999 | Bernet | ......................... 363/159 |
| 5,977,569 A | * 11/1999 | Li | ............................... 257/119 |
| 6,137,187 A | 10/2000 | Mikhail et al. | |
| 6,566,764 B2 | * 5/2003 | Rebsdorf et al. | .............. 290/44 |
| 6,603,647 B2 | * 8/2003 | Briesen et al. | .............. 361/91.1 |
| 6,711,038 B2 | * 3/2004 | Ziegler et al. | ............... 363/123 |
| 6,744,650 B2 | * 6/2004 | Mahlein et al. | .............. 363/149 |

OTHER PUBLICATIONS

International Publication No. WO 99/29025, Leijon et al., published Jun. 10, 1999.

International Publication No. WO 01/91279 A1, Rebsdorf et al., published Nov. 29, 2001.

* cited by examiner

Primary Examiner—Adolf Berhane
(74) Attorney, Agent, or Firm—Paul J. White

(57) ABSTRACT

A system and method for efficiently capturing electrical energy from a variable-speed generator are disclosed. The system includes a matrix converter using full-bridge, multilevel switch cells, in which semiconductor devices are clamped to a known constant DC voltage of a capacitor. The multilevel matrix converter is capable of generating multilevel voltage wave waveform of arbitrary magnitude and frequencies. The matrix converter can be controlled by using space vector modulation.

12 Claims, 14 Drawing Sheets

VARIABLE-SPEED WIND POWER SYSTEM WITH IMPROVED ENERGY CAPTURE VIA MULTILEVEL CONVERSION

CROSS REFERENCE TO RELATED APPLICATION

The present application claims priority to U.S. Provisional Application No. 60/384,637, filed May 31, 2002. Said Provisional Application is incorporated herein by reference.

CONTRACTUAL ORIGIN OF THE INVENTION

The United States Government has rights in this invention under Contract No. DE-AC36-99GO10337 between the United States Department of Energy and the National Renewable Energy Laboratory, a division of the Midwest Research Institute.

BACKGROUND OF THE INVENTION

Power converters are used to convert alternating current (AC) electric power from a fixed-frequency and fixed-voltage to different frequencies and different voltages for powering loads, such as electric motors. They are also used in reverse to convert variable-frequency, variable-voltage, AC electric power to fixed-frequency, fixed-voltage electric power. Electric generators driven by wind turbines rotate at different speeds, depending on wind conditions, so they produce variable-frequency, variable-voltage, AC electric power. Therefore, power converters are used to convert such wind-generated electric power to fixed-frequency, fixed-voltage, AC power to match public utility and similar AC power systems. However, wind turbine power systems also spend lots of time operating at light loads or fractions of their rated power capacities, whereas standard, state-of-the-art, power converters are designed to operate most efficiently at full-rated power all, or nearly all, of the time. Further, standard power converters do not work at low voltages. Therefore, when wind turbine-driven generators are operating in low wind, light load, conditions, standard power converters are inefficient and may not work at all.

SUMMARY OF THE INVENTION

It is a general object of this invention, therefore, to provide improvements over existing variable-speed, wind power technology that achieves high efficiency at low wind speeds and captures more wind energy.

Another object of the invention is to provide improvements in AC power converter technologies to enable more efficient and reliable conversion of variable-frequency, variable-voltage, AC power to fixed-frequency, fixed-voltage, AC power and vice versa.

A more specific object of this invention is to provide a more efficient and reliable power converter for wind power generator applications in which generated AC power varies over wide ranges of frequencies, voltages, and load levels, for converting such AC power to fixed-frequency, fixed-voltage, AC power for public utility and similar AC power systems.

Additional objects, advantages, and novel features of the invention shall be set forth in the description that follows, and others will become apparent to persons skilled in the art upon examination of the following or may be learned by the practice of the invention. The objects and advantages may be realized and attained by means of the instrumentalities and combinations particularly pointed out in the appended claims.

To achieve the foregoing and other objects and in accordance with the purposes of the present invention, as embodied and described either in general principles, in details, or both, the power converter comprises any one, or combinations of, the following features: (i) Multilevel power conversion is realized using a dc-link converter system in which at least the rectifier side operates with voltages switching between more than two levels and the switch modulation strategy is controlled as necessary to optimize efficiency at each intended turbine speed; (ii) Multilevel power conversion is realized using a multilevel matrix converter, and the switch modulation strategy is controlled as necessary to optimize efficiency at each intended turbine speed; and (iii) Several multilevel converters may be connected in parallel and, by selectively disabling one or more of these multilevel converters at low wind speed conditions, the fixed losses are reduced.

Variable-speed wind powered generators attempt to capture additional energy from the wind by optimizing turbine speed over a range of wind speeds. A problem with this approach is that it is difficult to optimize the electric power conversion parts of the system to operate with high efficiency at all turbine speeds. In particular, as the generator voltage is reduced, the efficiency of the power converter is typically degraded. A significant part of this invention is the discovery that light load inefficiencies of ordinary power converters used in wind power generation applications, such as fixed losses within the converters operating at reduced or low power levels, are more significant than was understood previously by persons skilled in the art, as well as the further discovery that the modularity principle discussed above is a very effective way to reduce such light load inefficiencies by operating an optimum number of smaller converters at or near their optimum efficiency levels, depending on wind speed and load conditions, instead of operating one larger power converter at inefficient voltage or power levels. In other words, any given total AC power output of the wind turbine generator can be handled by a plurality of smaller power converters, each one operating at or near its optimum high power converter efficiency level. The number of such smaller power converters actuated and operating at any given time is the number of them required to handle the particular total AC power load that exists at that time. Multilevel conversion is also applied, with voltages switching between more than two levels, whereas conventional power converters have a large switch that operates rapidly, switching between two positive and negative voltage levels or peaks, e.g., −700 volts to +700 volts. The multilevel switching algorithm is altered when wind generator voltage is low in magnitude to improve converter efficiency. A new multilevel matrix converter system is used to implement such modularity in the multilevel voltage ranges. Inductance is used instead of capacitance, which accommodates use of a buck-boost voltage to sustain converter operation in low wind, low voltage conditions.

BRIEF DESCRIPTION OF THE DRAWINGS

Other objects and advantages of the invention will become apparent upon reading the following detailed description and upon reference to the drawings in which.

Figure 1:
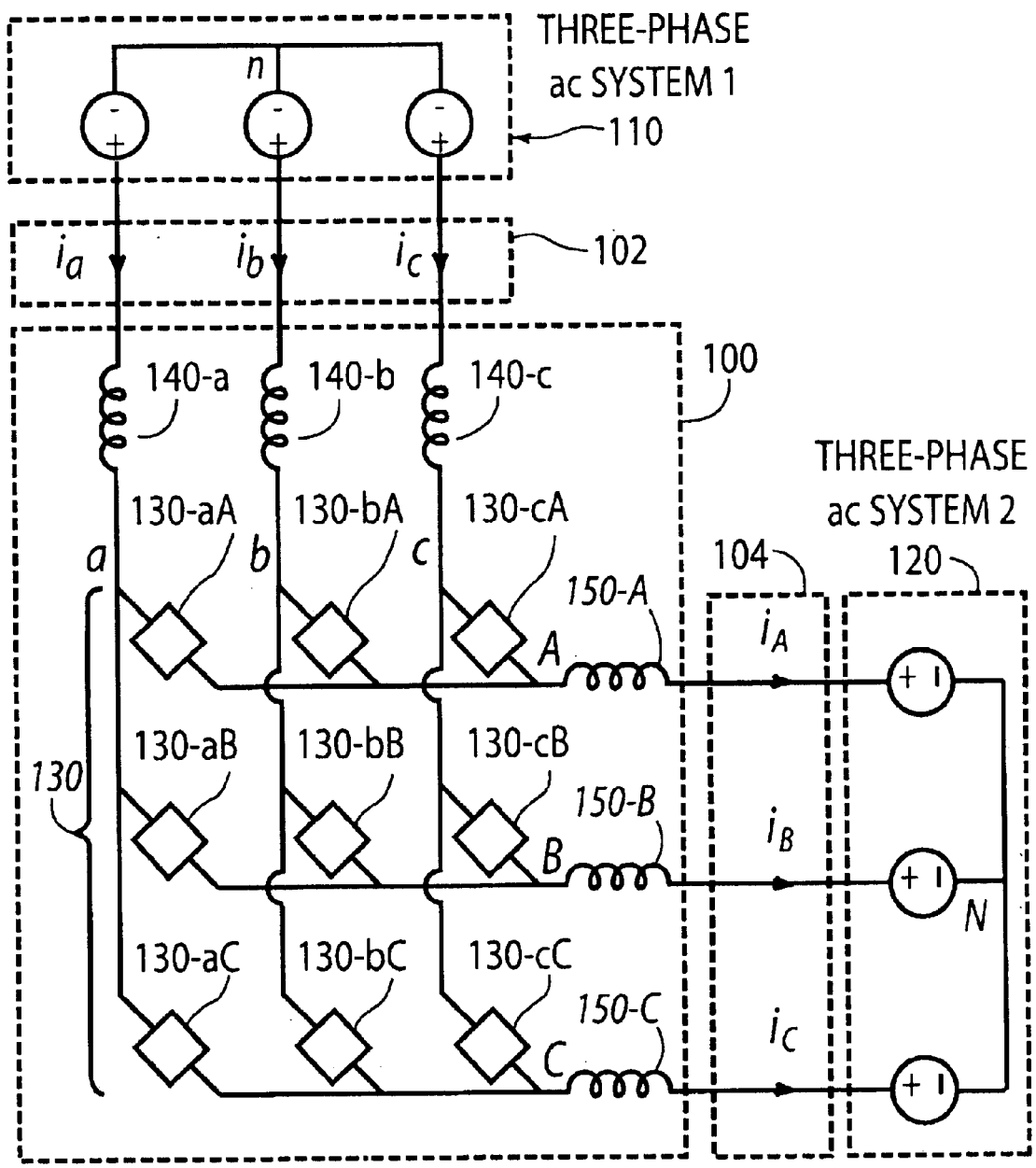
FIG. 1 is a schematic diagram of a basic matrix converter according to one aspect of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EXAMPLE EMBODIMENTS

Multilevel Matrix Converter

Referring to FIG. 1, a three-phase multilevel matrix converter 100 in one example embodiment of the invention is illustrated as being connected at the input end 102 to a three-phase ac generator 110 and at the output end 104 to a three-phase utility system 120. The converter 100 includes nine switch cells 130, each of which links together some unique combination of an input phase (a, b, or c) and output phase (A, B, or C). Conversely, each combination of input and output phases is linked by a unique switching element, as will be described below. Each of such individual switching elements is identified for convenience by the combination of phases that it links together. Thus, for example, the particular switch cell 130 that is connected between the input phase a and the output phase A considered to be switch cell 130-aA, the particular switch cell 130 that is connected between the input phase b and the output phase, and so on.

The generator 110 can be any electrical generator. For example, it can be a wind turbine generator or a motor.

The matrix converter 100 further includes filter inductors 140-a, -b, and -c at the generator side, or input end 102, and 150-A, -B and -C at the utility side, or output end 104. Any suitable inductors can be used. In an illustrative embodiment, all six inductors are the same and have the following characteristics:

| | |
|---|---|
| Inductance: | 0.2 mH |
| Saturation current: | 50 A |
| Winding: | 26 turns of 8 ounce copper foil |
| Air gap: | 1.64 mm |
| Core material: | iron-based METGLAS amorphous alloy cores, Bmax = 1.4 Tesla |
| Core size: | AMCC 63 |
| Dimensions: | H = 10.2 cm |
| | W = 5.2 cm |
| | L = 3.0 cm |
| Core cross-sectional area: | 3.9 cm². |

Figure 2:
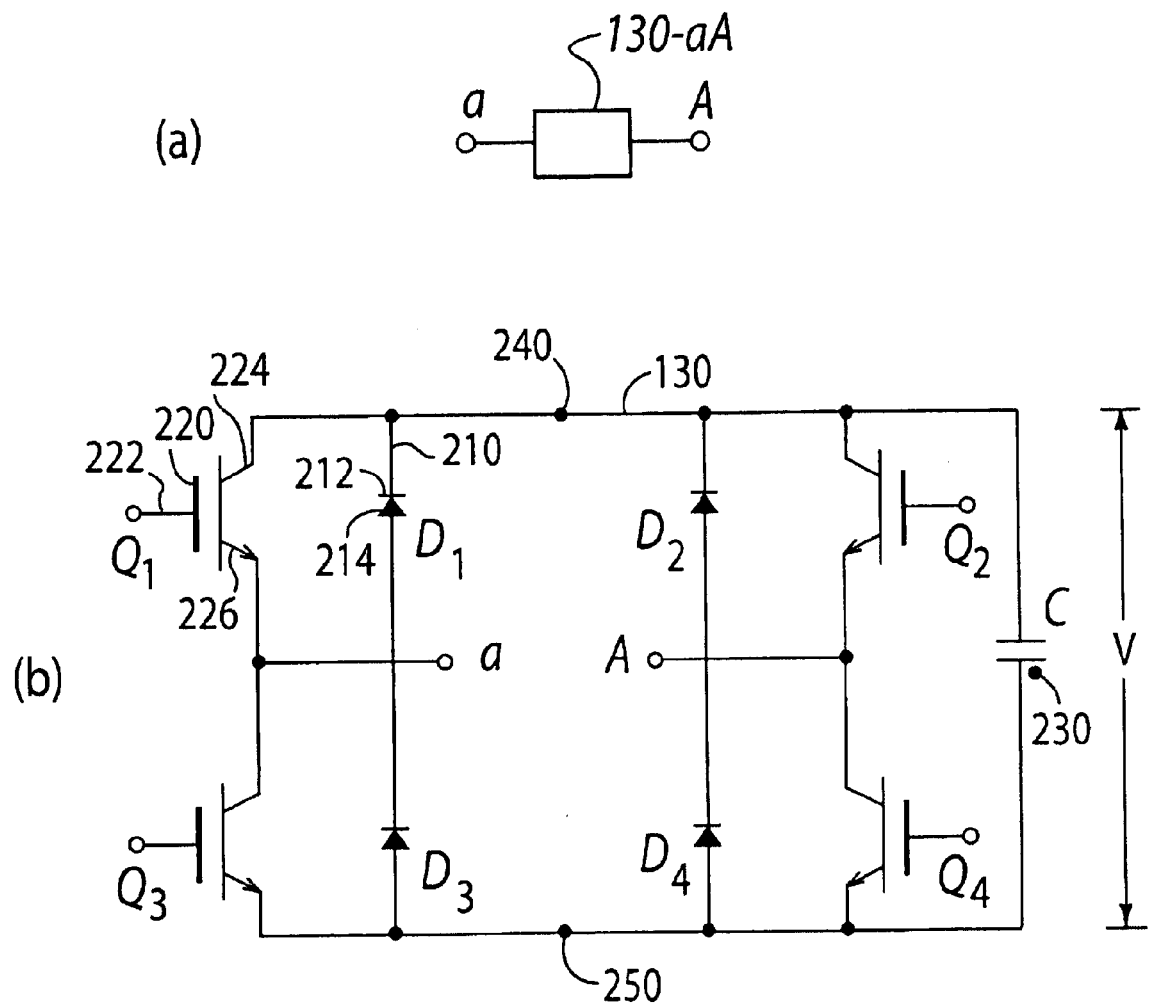
FIG. 2 is a schematic diagram of one of the switch cells of the matrix converter shown in FIG. 1.

Each of the switch cells 130-aA, -aB, -aC, -bA, -bB, -bC, -cA, -cB and cC in the illustrative embodiment has an H-bridge network as illustrated in FIG. 2. Each cell 130 has four identical units, each of which has a diode 210 and a transistor 220. The gate 222 of the transistor 220 is to be connected to a controller (not shown in FIG. 2), which turns the transistor 220 on or off. The transistor 220 and the diode 210 are connected together in an anti-parallel fashion. Any suitable power transistor and diode can be used. In particular, isolated-gate bipolar transistors ("IGBT") are well suited for power switching applications. In an illustrative embodiment, the 600 V "SMPS Series" n-channel IGBT devices (Intersil part # HGTG30N60A4D) were used. The TO-247 packages include anti-parallel "hyperfast" diodes. The datasheet ratings are:

Collector-to-emitter voltage 600 V;
Continuous collector current 60 A; and
Pulsed collector current 240 A.

The four transistor-diode pairs are connected to form a full-bridge inverter, with a positive node 240 and negative node 250. A DC bus capacitor 230 is connected between the positive and negative nodes 240, 250. The transistors and diodes within each cell are clamped to the capacitor voltage, V, which can be regulated to a known value. Thus, each switch cell 130 is capable of producing between the input and output terminals (a-A, a-B, etc.) the instantaneous voltages +V, 0, and −V, when at least one of the transistors 220 conducts, and is capable of blocking voltages of magnitude less than V when all of the transistors 220 are off.

The use of four transistors in the switch cell 130, as shown in FIG. 2 allows the average current to be doubled, relative to a conventional matrix converter whose four-quadrant switches are realized using two transistors and two diodes. This result is obtained, because the currents conducted by the IGBTs are thermally limited, and, by proper control, the current stresses can be spread over all four transistors 220 in FIG. 2.

The circuit of FIG. 1 is capable of limited multilevel operation. The semiconductor devices must be rated at least as large as the peak applied line-to-line voltage. The converter 100 is capable of both increase and decrease of the ac voltage magnitude.

Figure 12:
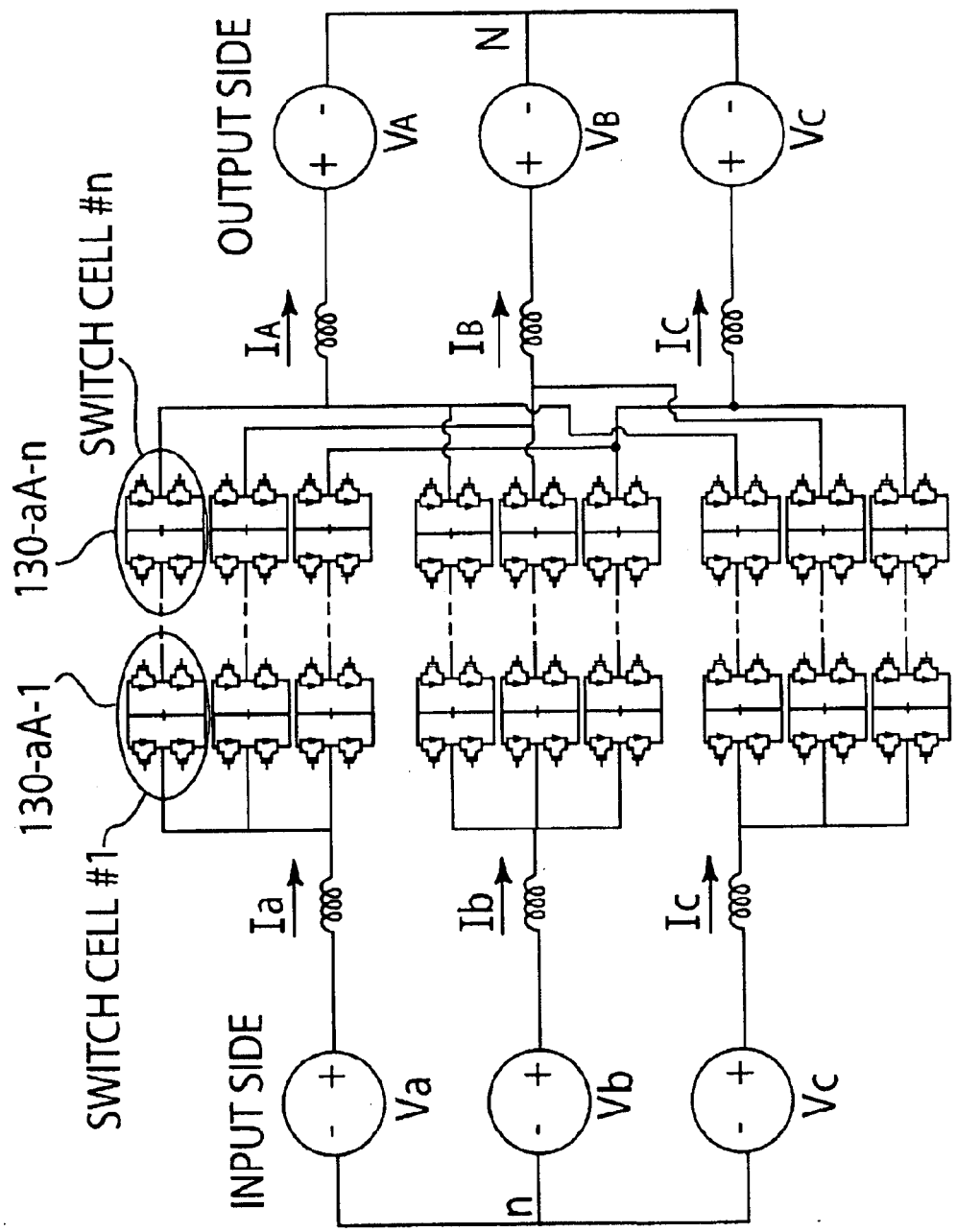
FIG. 12 is a schematic diagram of a multilevel matrix converter having multiple switch cells in series in each branch connecting an input phase to an output phase.

The number of voltage levels can be increased. FIG. 12 illustrates one approach to increasing the terminal voltage levels. The switch cells, for example cells 130-aA-1 through 130-aA-n (total of n cells) are connected in series in each branch of the switch matrix. This allows increase of the terminal voltages without changing the voltage ratings of the semiconductor devices. Multiple switch cells or strings of serially connected switch cell can also be connected in parallel in each branch, preferably with an inductor in series with each cell of string of cells as a current isolator.

The multilevel matrix converter 100 according to the invention synthesizes the input and output voltage waveforms by switching the known capacitor voltages of the switch cells 130. This operation differs from that of conventional matrix converters in which voltage waveforms are synthesized on one side and current waveforms on the other. Because of the symmetry of the converter 100, both step-up and step-down of the voltages are possible.

Although all nine switch cells 130 can be conducting at any given time, in certain cases it may be desirable that fewer cells be conducting at once. For example, because of the inductors 140 and 150 at both sides of the converter 100, current typically should flow continuously through the input and output phases. Hence, operation of the switch cells 130 should typically not lead to the open-circuiting of an input or output phase. Further, conduction of the switch cells 130 should typically not form a closed loop within the branches of the switch matrix, since such a closed loop could short-circuit the capacitors 230 of the switch cells. Third, the voltage applied to an open switch cell 130 should not exceed the magnitude of its capacitor 230 voltage. These constraints limit the possible connections within the switch matrix and imply that, at any given instant under normal operating conditions, exactly five of the nine branches of the switch matrix should conduct. Further, the following rules typically apply to the connections that are possible at a given instant:

There is exactly one connection path between any two phases;

If any phase on one side (i.e., the input side 102 or output side 104) is connected directly to two conducting branches, then there must be exactly one other phase from the same side also connected directly to two conducting branches. The third phase must be connected directly to one conducting branch;

If any phase on one side (i.e., the input or output side) is connected directly to three conducting branches, then the other two phases from the same side must be each connected directly to exactly one conducting branch;

Table I summarizes the possible configurations. There are a total of 81 valid choices of branch connections.

TABLE I

POSSIBLE BRANCH CONNECTION CONFIGURATIONS

| Phase A or a | Phase B or b | Phase C or c |
|---|---|---|
| 1 branch | 1 branch | 3 branches |
| 1 branch | 2 branches | 2 branches |
| 1 branch | 3 branches | 1 branch |
| 2 branches | 1 branch | 2 branches |
| 2 branches | 2 branches | 1 branch |
| 3 branches | 1 branch | 1 branch |

The converter 100 can interface two asynchronous three-phase ac systems. Both interfaces are inductive in nature, whether intrinsically or through addition of series inductors 140, 150. In the configuration of FIG. 1 the converter 100 has nine branches that each has a switch cell 130 as shown in FIG. 2. As noted above, to avoid interrupting the six inductor currents, exactly five branches typically must conduct current at any instant in time. It is also important to avoid the cross-conduction and shoot-through currents that can occur when the transistors 220 of six or more branches conduct. However, turning off the transistors of five or more branches does not cause a calamity, because the antiparallel diodes 210 can conduct current and provide a path for the inductor currents to flow. Energy stored in the inductors 140, 150 is then transferred to the capacitors 230 of the switch cells 130. One simple method for controlling the switching transitions is to first turn off all transistors 220 that are to be switched off, and then after a short delay, turn on the transistors 220 that are to be switched on. Myriad other soft-switching schemes can also be used in this invention. Such other soft-switching schemes are known and can easily be applied by persons skilled in the art, once he or she understands the principles of this invention, and thus need not be described further.

Each switch cell 130 of the multilevel matrix converter 100 has three switch states corresponding to voltages of $+V$, 0, and $-V_x$, which means that there are three switch states that a switch cell 130 may assume when it is used in a conducting branch. Since there are m (e.g., five) branches that may be turned on at any particular instant and three switch states per conducting switch cell 130, the number of possible device switching combinations for each case of branch connection is $3^m$ possible device switching combinations. With 81 cases of branch connections, the total number of device switching combination for five branches becomes $3^5 \times 81 = 19683$ possible device switching combinations.

Figure 3:
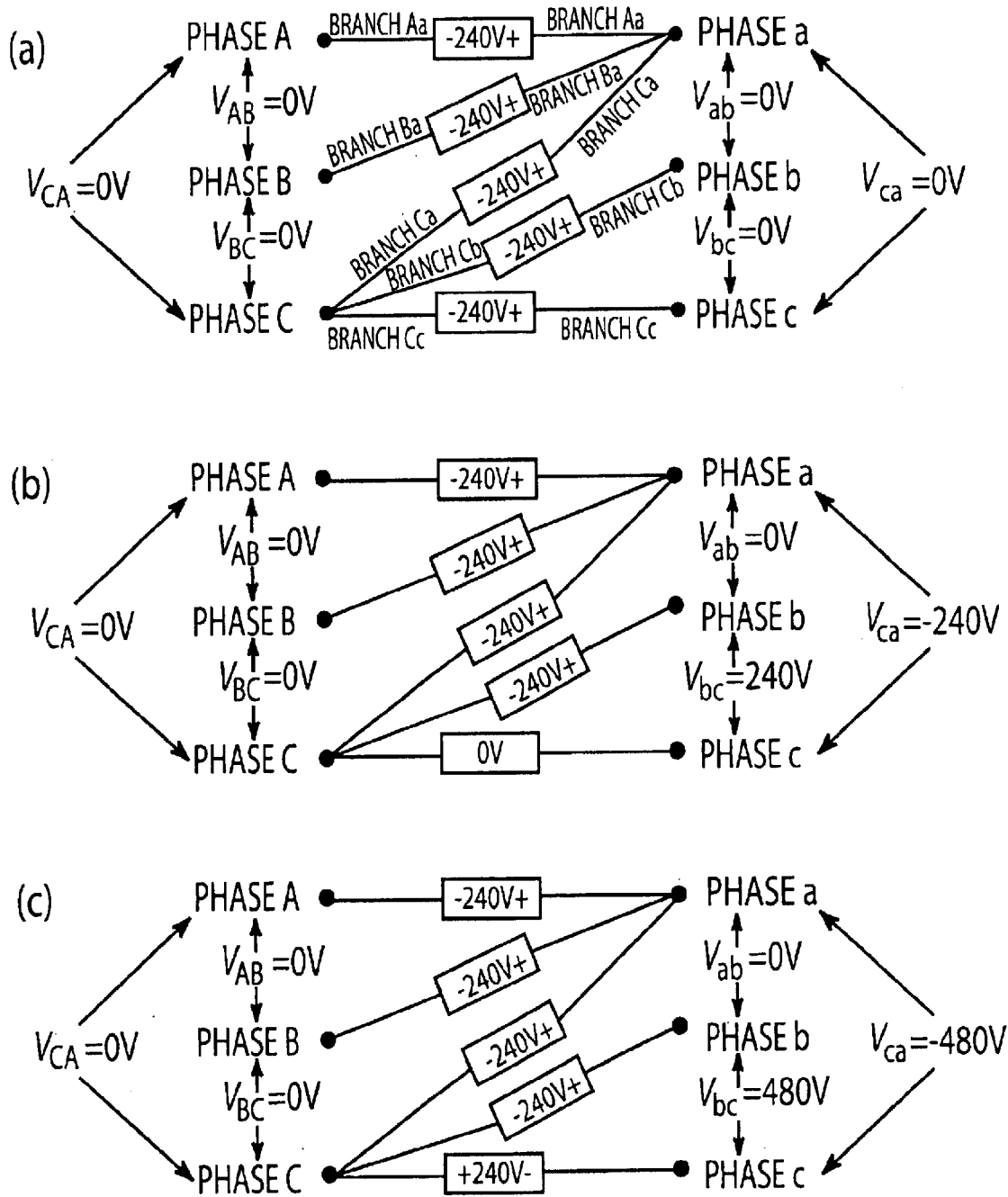
FIG. 3 is a schematic diagram of three possible switching combinations for one choice of branch connection.
Figure 5:
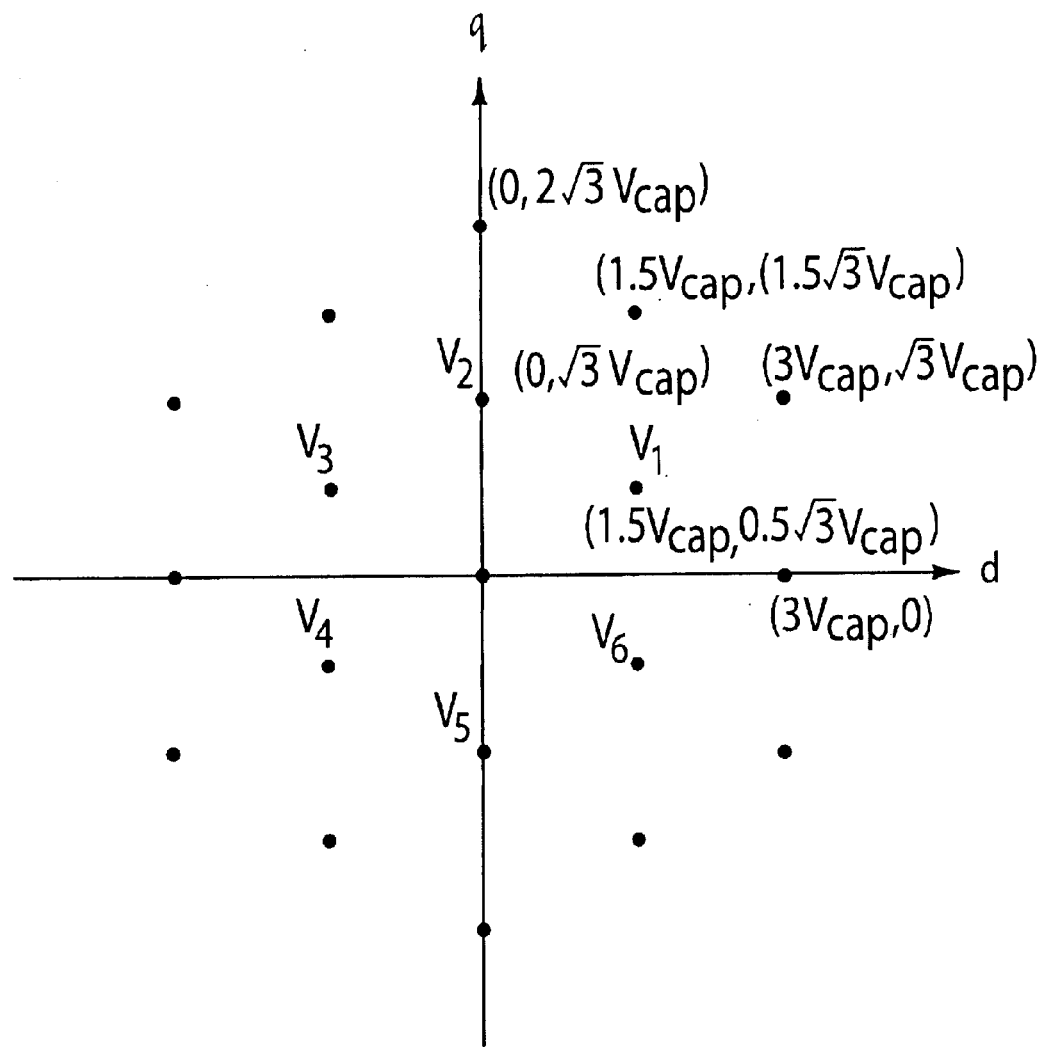
FIG. 5 illustrates the space vectors attainable by the basic matrix converter shown in FIG. 1.

FIG. 3 shows an example of three different device switching combinations for one case of a branch connection with branches conducting between phases A-a, B-a, C-a, C-b, and C-c. FIG. 3 shows that it is possible to obtain five different output voltage levels from the multilevel matrix converter 100 by switching only the devices of one switch cell 130 (in branch C-c). For this example, if it is assumed that the midpoint capacitor voltage V is set to +240 $V_x$, FIG. 5(a) produces 0 volts for all line-to-line voltages on both sides of the converter 100. This result can be obtained by operating all switch cells 130 of the conducting branches to produce voltages of +240 V. By changing the switch cell 130-cC connecting branches C-c to produce a voltage of zero, the converter 130 can produce line-to-line output voltages of −240 V, 0 V, and +240 V, as shown in FIG. 5(b). In FIG. 5(c), output line-to-line voltages of −480 V, 0 V, and +480 V are obtained. By alternating between the three device switching combinations of FIG. 5, the basic multilevel matrix converter 100 can produce five-level voltage waveforms with voltage levels at −480 V, −240 V, 0, 240 V, and 480 V at one side of the matrix converter 100. In each case, the nonconducting switch cells 130 block voltages of magnitude 240 V.

Control

The controller of the multilevel matrix converter typically must perform the following major tasks.

1. Maintain fixed voltage (charge regulation) across all midpoint capacitors 230; and
2. Synthesize input and output voltage waveforms.

Figure 4:
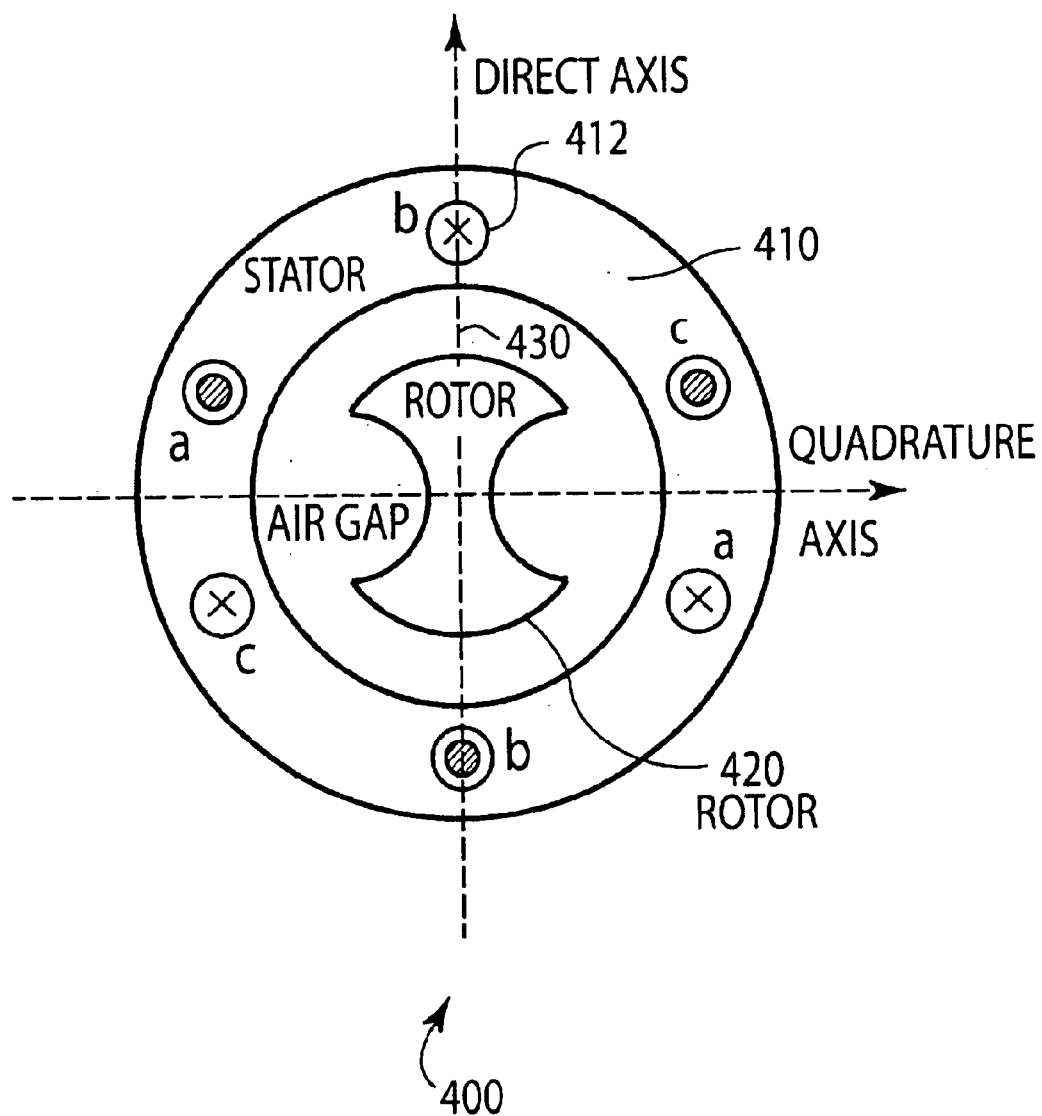
FIG. 4 is a schematic diagram of the coordinate system used to represent space vectors, which facilitates illustration and explanation of some aspects of the invention.

According another aspect of the invention, control that simultaneously handles the above two tasks is accomplished by space vector modulation ("SVM"). In visualizing space vector modulation, vectors in a two-dimensional coordinate system can be used to represent a three-phase voltage, because the three phases are not independent. Referring to FIG. 4, such coordinate system can be defined relative to the stator 410 of a two-pole salient-rotor synchronous machine 400. The "direct" axis ("d-axis") is the axis along which the gap 430 between the stator 410 and the rotor 420 is the smallest.

Upon analysis of all possible switching combinations, it is found that the nineteen space vectors illustrated in FIG. 5

(by solid round dots) are attainable at each side of the converter. Control of the input-side voltage is achieved by modulating between space vectors adjacent the desired reference vector. Simultaneously, similar control is applied to control the output-side voltage. Even when both the input and output-side voltages are controlled, there exist additional degrees of freedom that can be used to control the capacitor voltages V.

Figure 6:
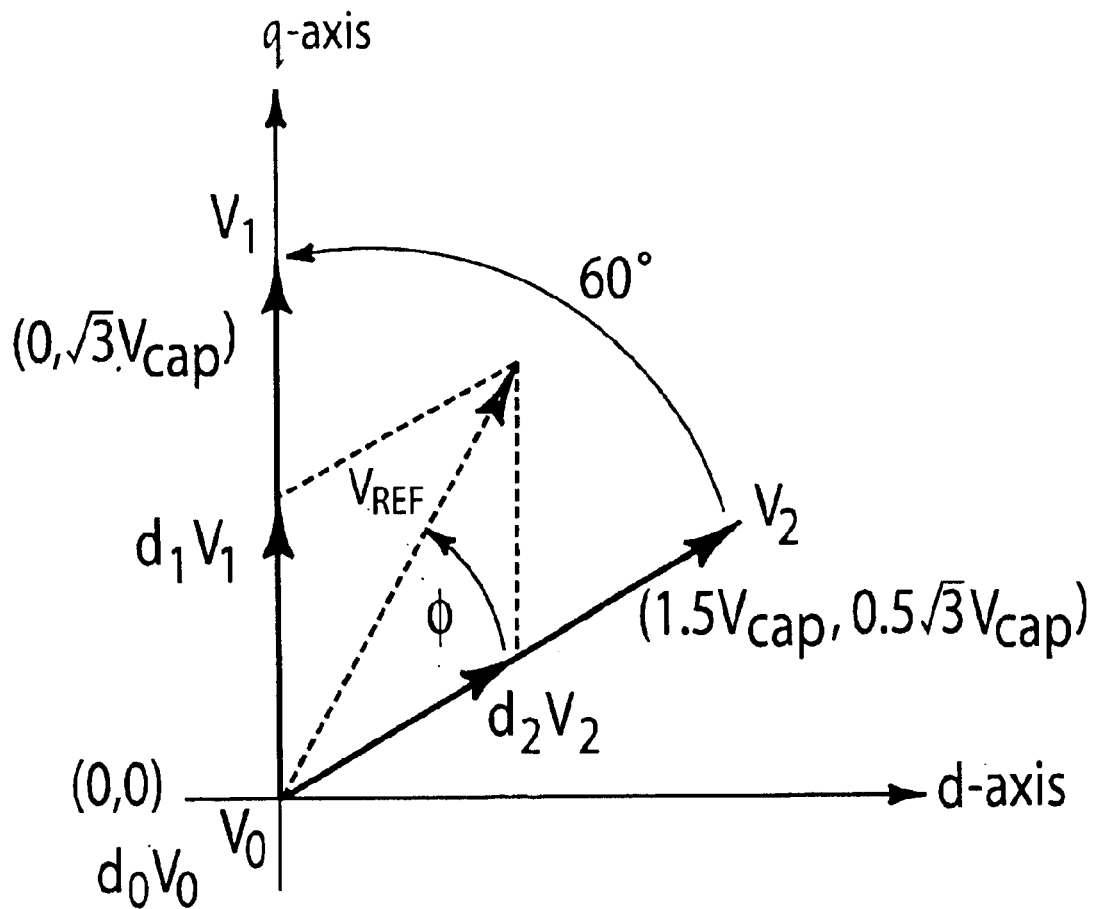
FIG. 6 is a diagram illustrating the synthesis of a reference voltage from the adjacent space vectors.

For example, consider the space vector modulation illustrated in FIG. 6. At a given point in time, it is desired to produce the reference space vector $V_{REF}$, which can be accomplished by modulating between three adjacent space vectors $V_0$, $V_1$, and $V_2$. The reference space vector $V_{REF}$ is expressed as a linear combination of the space vectors $V_0$, $V_1$, and $V_2$:

$$V_{REF}=d_0V_0+d_1V_1+d_2V_2 \quad (1).$$

The duty cycles $d_1$, $d_2$, and do represent the durations for device switching combinations producing the space vectors $V_0$, $V_1$, and $V_2$, relative to the space vector modulation period. Since only three space vectors are used in this example, the three duty cycles must add to unity. The duty cycles are found by solution of the geometry of FIG. 7:

$$d_1 = |V_1| = |V_{REF}|\sin(\phi) \quad (2)$$

$$d_1 = \frac{|V_{REF}|}{|V_1|}\sin(\phi) = M\sin(\phi)$$

$$d_2|V_2| = |V_{REF}|\sin(60° - \phi)$$

$$d_2 = \frac{|V_{REF}|}{|V_2|}\sin(60° - \phi) = M\sin(60° - \phi)$$

$$d_0 = 1 - d_1 - d_2$$

$$M = \frac{|V_{REF}|}{|V_1|} = \frac{|V_{REF}|}{|V_2|}$$

The term M in (2) is the modulation index, and its value cannot exceed unity as long as $|V_{REF}| \leq |V_1|$ and $|V_{REF}| \leq |V_2|$. Thus, the reference space vector $V_{REF}$ is synthesized by modulating through switch 130 configurations producing the space vectors $V_0$, $V_1$, and $V_2$ during a given SVM period.

With the above approach, the multilevel matrix converter 100 is capable of operating with universal input and output voltage, frequency, and power factor.

Figure 7:
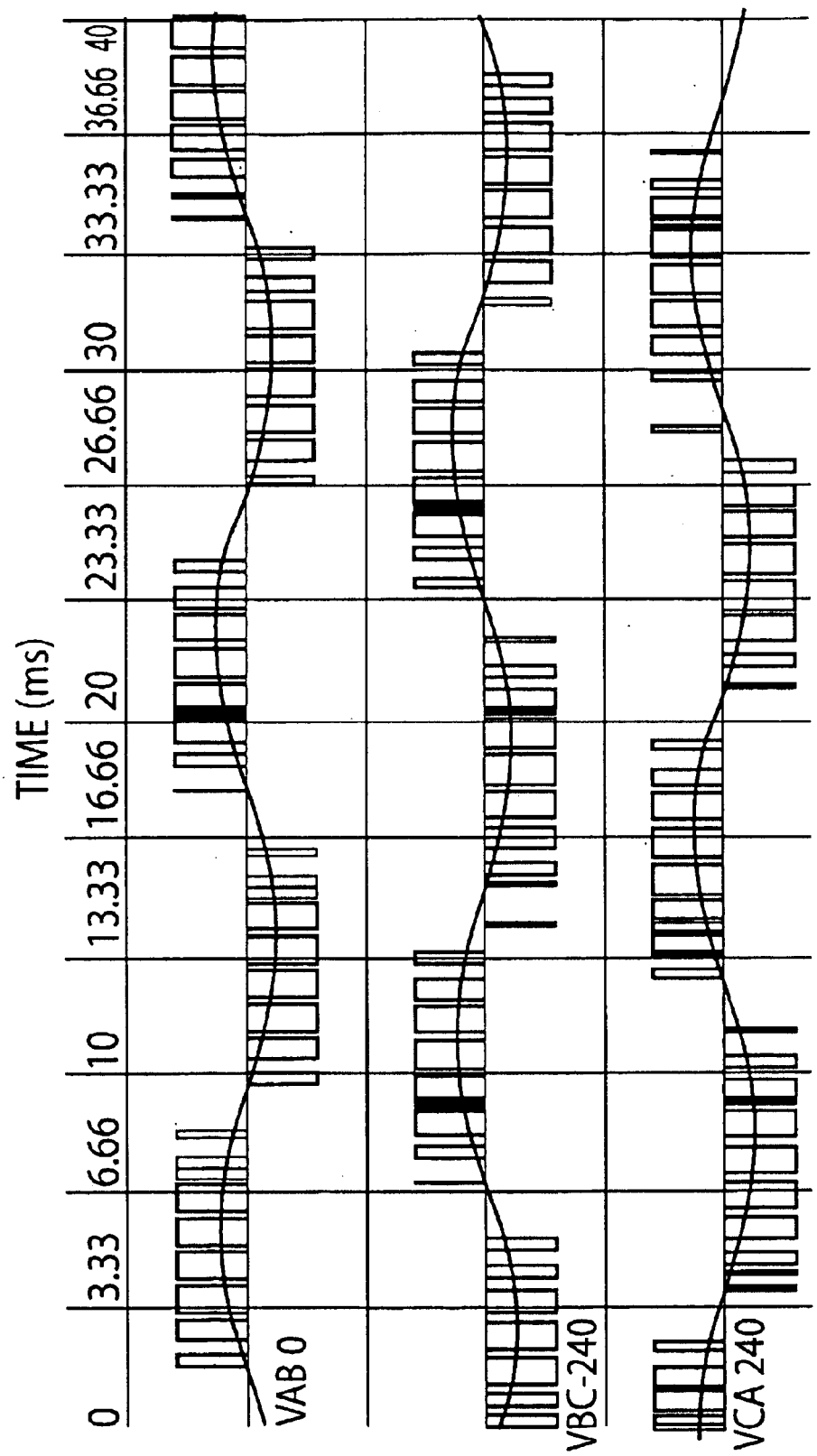
FIG. 7 shows an example simulated utility-side space vector modulated ("SVM") line-line voltages and inductor currents, with a unity power factor, for the basic matrix converter shown in FIG. 1.

To illustrate operation of the proposed multilevel matrix converter, simulations of operation at two different operating points are given in FIGS. 7 to 12. In these examples, the multilevel matrix converter interfaces a variable-speed wind generator to a 60 Hz utility. FIG. 7 shows simulated voltage and current waveforms for the three-phase ac utility side. The utility side is at 240 V, 11 A, 60 Hz, and unity power factor. For this operating point, the generator side is at 240 V, 25 Hz, and unity power factor. The converter 100 switching frequency is set to 1 kHz. The simulator implements the space vector modulation described above to control the multilevel matrix converter 100, and hence synthesizes the desired pulse-width modulation ("PWM") input and output voltage waveforms. The pulse-width modulated waveforms in FIG. 7 are line-to-line voltages and the sinusoids are phase currents. Since this phase sequence is positive, the set of phase currents lags the set of line-to-line voltages.

Figure 8:
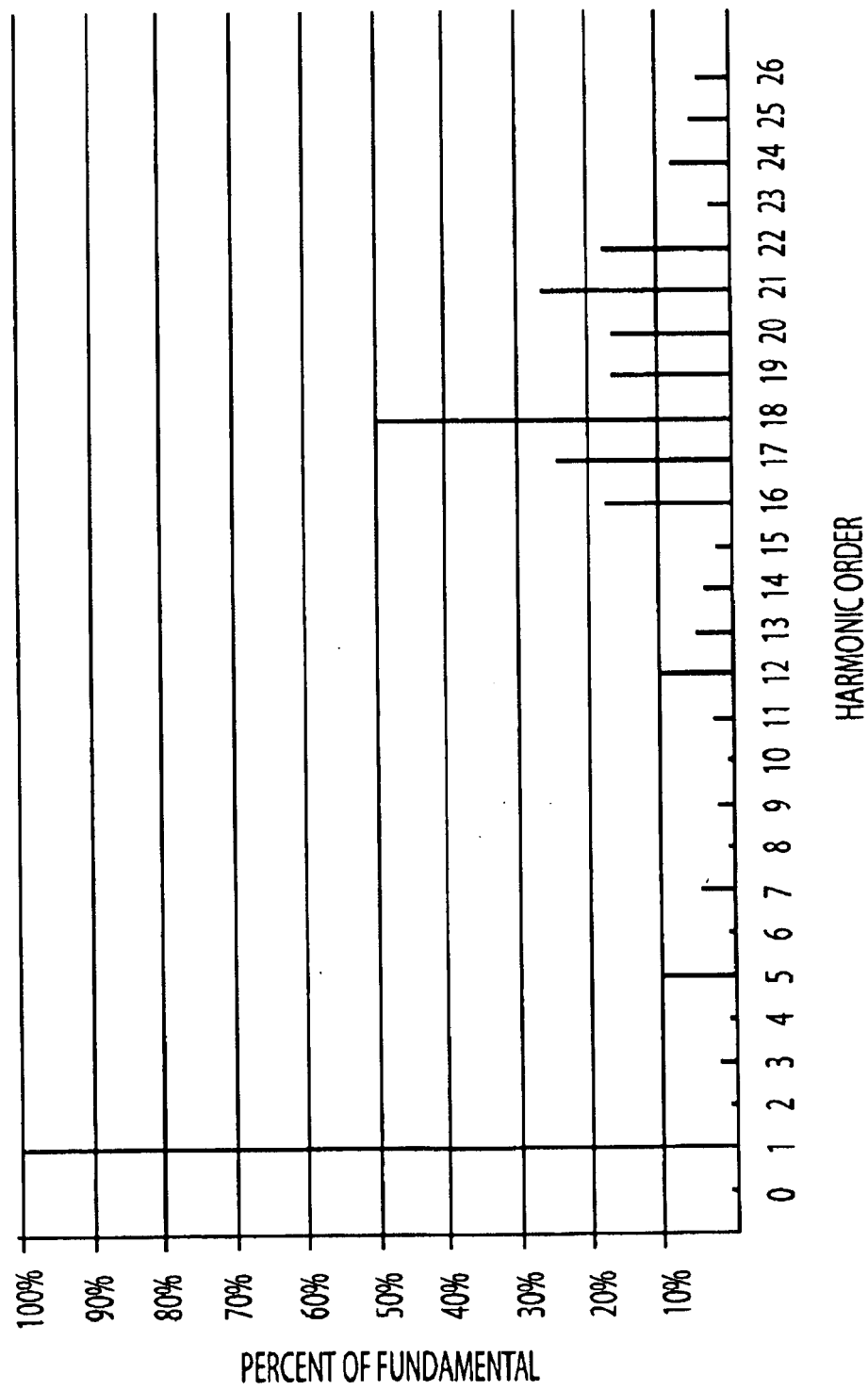
FIG. 8 shows the harmonic spectrum of the utility-side voltage of the example in FIG. 7.

FIG. 8 shows the harmonic spectrum of utility side line-to-line voltage $V_{A\_B}$. Notice the high magnitude harmonics in the vicinity of the 18th harmonic, which are due to the switching frequency of 1 kHz.

Figure 9:
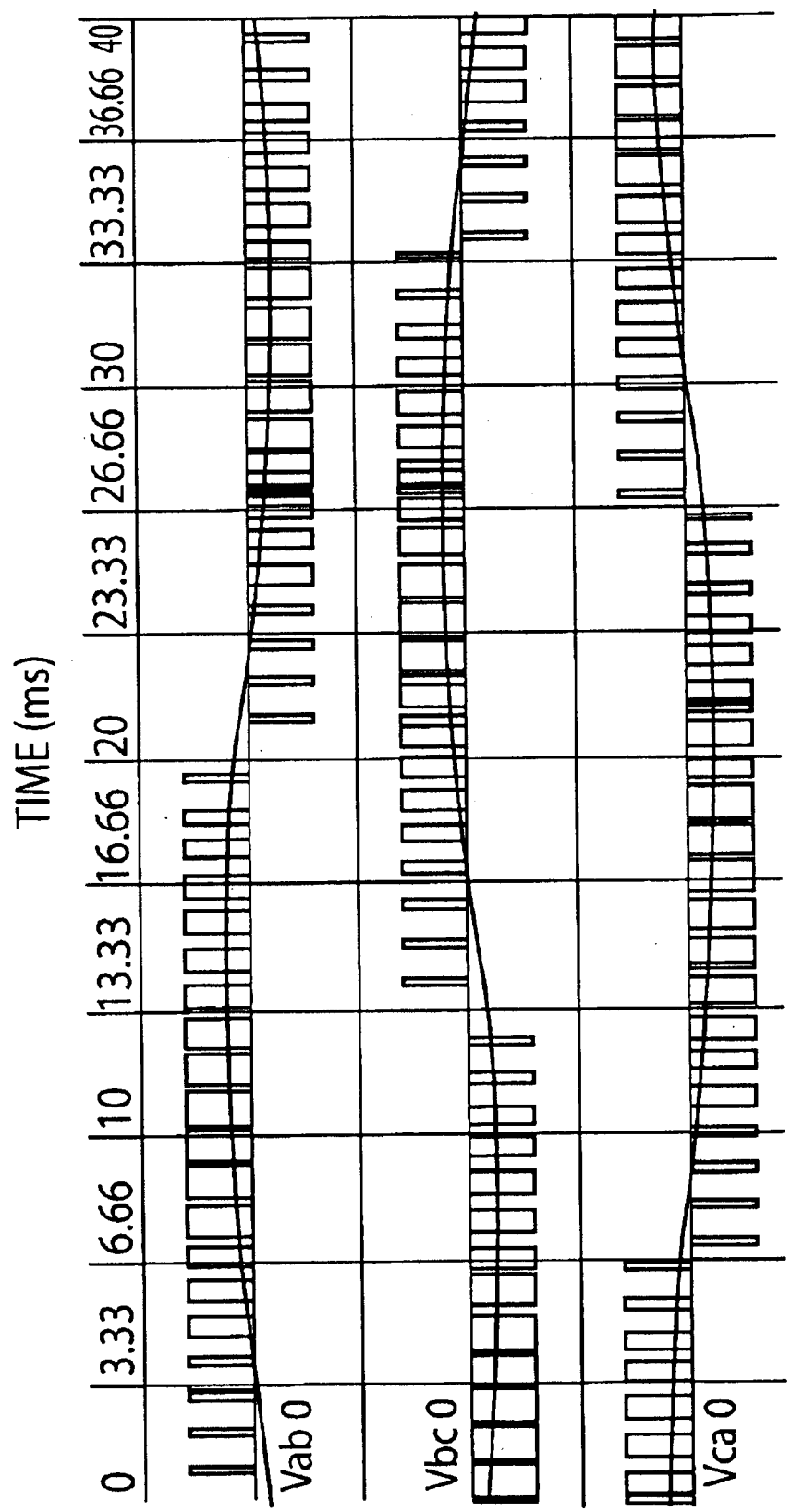
FIG. 9 shows a simulated generator-side space vector modulated ("SVM") line-line voltages and inductor currents.

FIG. 9 shows the generator-side voltage and current waveforms for the same operating point. The simulator is programmed to select appropriate device switching combinations to maintain constant the voltages across all switch cell capacitors 230 in addition to synthesizing the desired input and output waveforms. Using nine switch cells 130 constitutes the most basic converter 100 configuration with one switch cell 130 per branch. All capacitor voltages are maintained within +/−12% of their nominal values.

Figure 10:
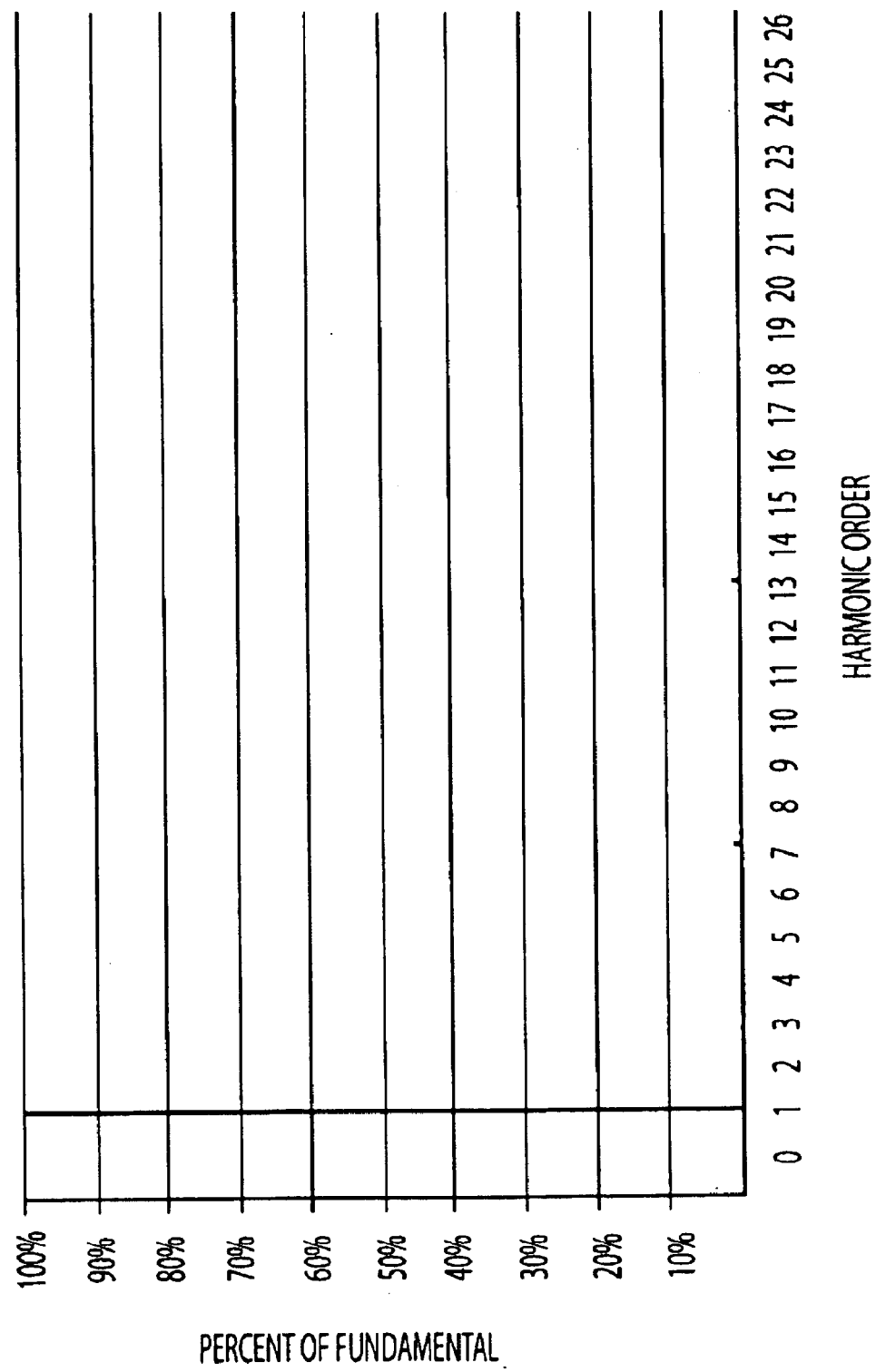
FIG. 10 shows the harmonic spectrum of the utility-side voltage at an example increased switching frequency of 20 kHz.

FIG. 10 illustrates the effect on the spectrum of increasing the switching frequency to 20 kHz. The harmonic spectrum of the utility side line-to-line voltage $V_{AB}$ is plotted. Notice that all of the high magnitude harmonics of FIG. 10 are moved to higher harmonic numbers, corresponding to the 20 kHz switching frequency.

Figure 11:
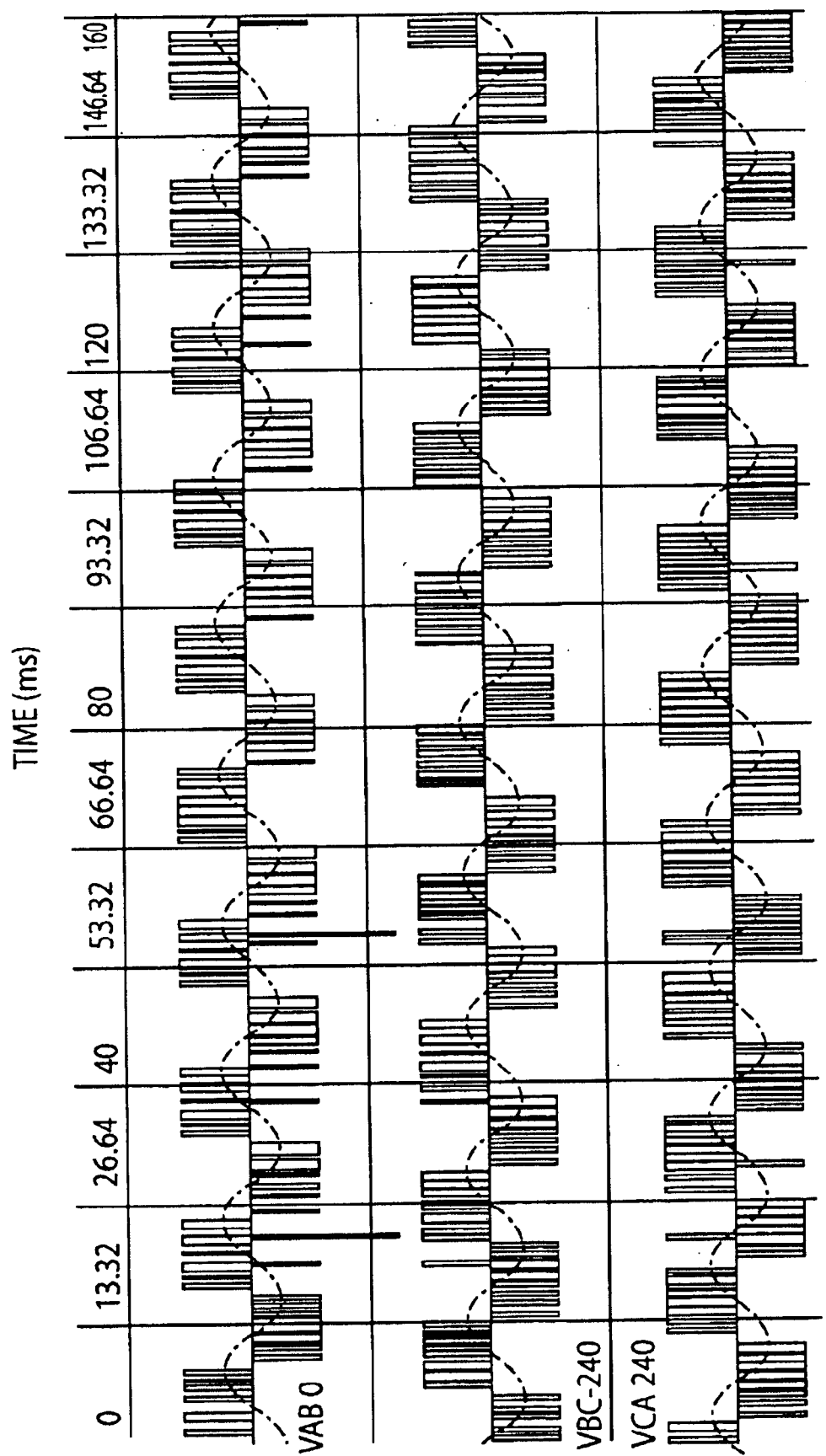
FIG. 11 shows an example simulated utility-side voltage and inductor currents, with a non-unity power factor.

Operation at non-unity power factor is illustrated next. At this point, the utility-side 104 voltage and current are 240 V 11 A, 60 Hz, 0.5 power factor, with 1 kHz switching frequency. The generator side 102 operates at 60 V, 6.25 Hz, and unity power factor. The utility-side 104 waveforms are illustrated in FIG. 11.

Thus, operation of the multilevel matrix converter 100 according to the invention is confirmed. The utility-side 104 and generator-side 102 waveforms can be controlled simultaneously and independently. The capacitor 230 voltages of the switch cells 130 can also be regulated.

Figure 13:
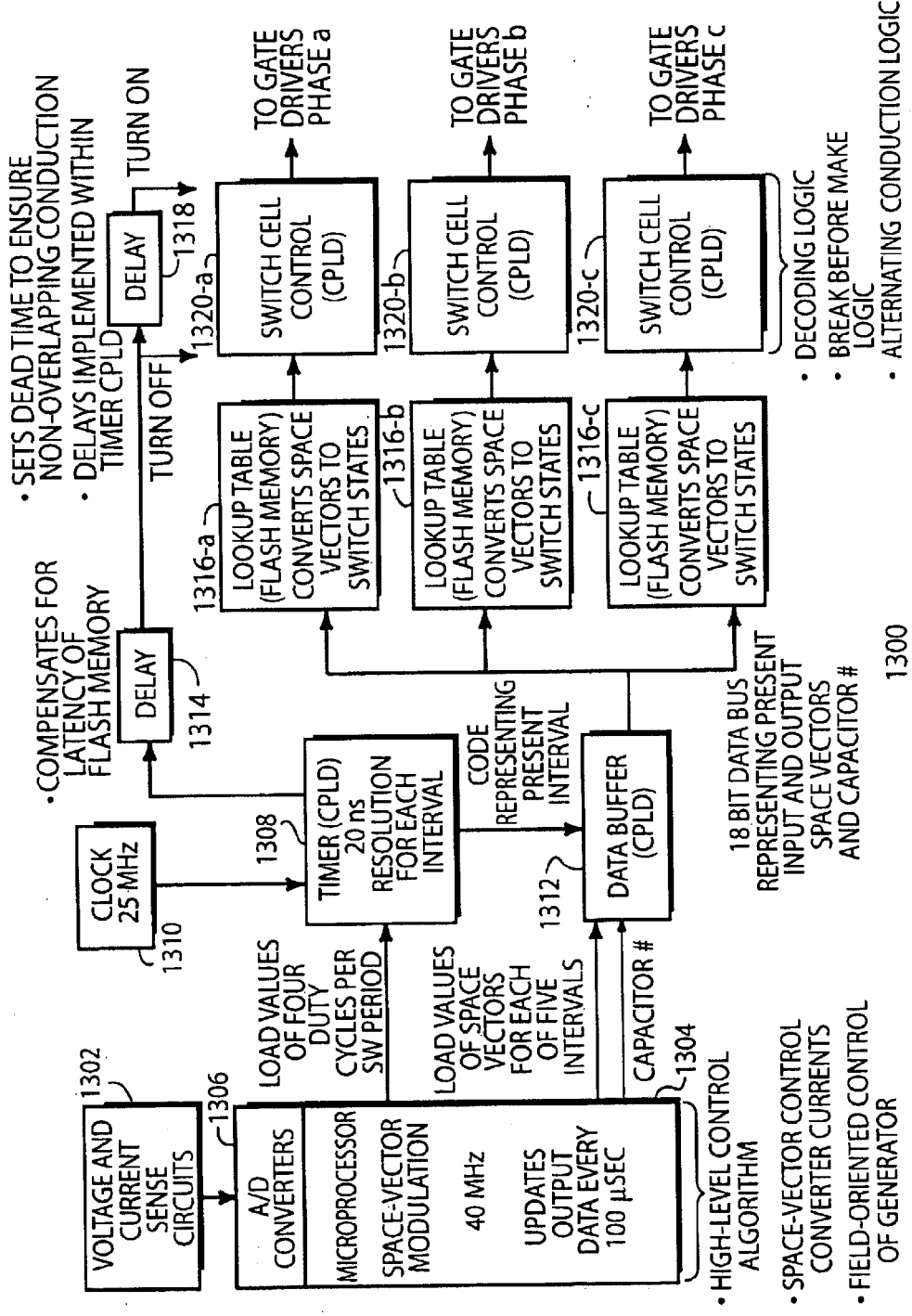
FIG. 13 is a functional block diagram of a control system for a multilevel matrix converter according to another aspect of the invention.

Referring to FIG. 13, a control system and its operation according to another aspect of the invention are explained. The utility and generator voltages and currents are sensed by sensing circuits 1302 such as Hall effect devices, and are digitized using analog-to-digital converters (ADC) 1306. The microcontroller 1304 transforms these into d-q coordinates. The dc capacitor 230 voltages of the nine switch cells 130 are measured using differential amplifier circuits, and digitized using ADC's. The microcontroller 1304 performs the space vector modulation algorithm described above, and commands the switching of the semiconductor devices. The microcontroller is interfaced to the switch cells through complex programmable logic devices (CPLDs); in the illustrative system, there are a total of five CPLD's (timer 1308, data buffer 1312, and switch cell control 1320-a, -b and -c) and three flash memory chips (lookup table chips 1316-a, -b and -c). The CPLDs are addressable by the microcontroller 1304, and store the current state of all switches. In addition, the state of all switches during the next sub-interval can be loaded into the CPLDs. At the beginning of a subinterval, the microcontroller 1304 commands the CPLDs to change their outputs to the new states, thereby causing the IGBTs 220 to switch.

To avoid cross-conduction of the IGBTs 220 during their switching transitions (which would lead to momentary shorting of the dc bus voltages through the IGBTs), the turn-off transitions of the IGBTs occurs first. In other words, those IGBTs that were previously on, but will be turned off, are switched first. After a controllable delay (the 200 ns block 1318 illustrated in FIG. 13), the turn-on transitions are triggered (i.e., the IGBTs that were previously off, but will be turned on, are switched). The outputs of the CPLDs are connected through isolated gate driver chips (not shown) to the IGBTs.

Figure 14:
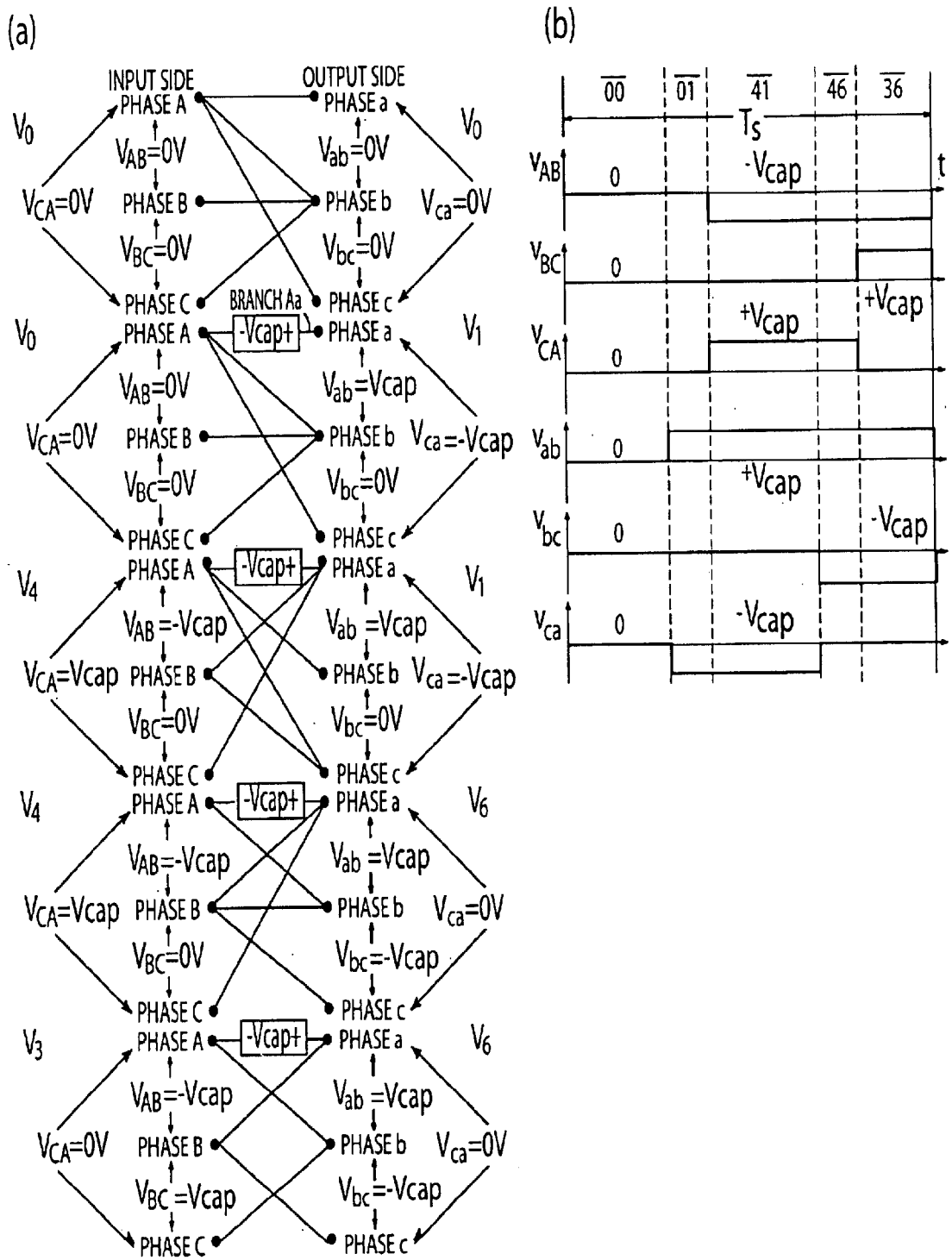
FIG. 14(a) is a diagram illustrating the switch combinations for obtaining an input reference voltage space vector between $V_3$ and $V_4$, and an output reference voltage space vector 180° from the input vector and between $V_6$ and $V_1$.
FIG. 14(b) is a voltage waveforms resulting from the combination shown in FIG. 14(a).

As an example, suppose (arbitrarily) that an input reference voltage space vector between $V_3$ and $V_4$, and an output reference voltage space vector 180° from the input vector (between $V_6$ and $V_1$) is desired. FIG. 14(a) illustrates the switch combinations for obtaining such a result, and FIG. 14(b) is a voltage waveforms resulting from the combination shown in FIG. 14(a).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A switch cell, that is used in a switch branch of a matrix converter, that generates a multilevel output voltage signal from a multiphase ac electrical input signal having a first set of voltages, frequencies and phases, said output voltage signal being applied to an output leg of said matrix converter to generate a multiphase ac electrical output signal having different voltages, frequencies and phases, said switch comprising:

four inverter arms, each of said four inverter arms comprising a diode having a positive pole and a negative pole, and a transistor having a gate, an emitter and a collector, said emitter connected to said negative pole of said diode and said collector connected to said positive pole of said diode, a first of said four inverter arms being connected to a positive node of said full bridge inverter and to an input leg of said plurality of input legs, a second of said four inverter arms being connected to said positive node of said full bridge inverter and to an output leg of said plurality of output legs, a third of said four inverter arms being connected to a negative node of said full bridge inverter and to said input leg, and a fourth of said four inverter arms being connected to said negative node of said full bridge inverter and to said output leg;

a capacitor that is connected between said positive node of said full bridge inverter and said negative node of said full bridge inverter, that is charged to a dc voltage from said multiphase ac electrical input signal to produce said multilevel output voltage signal.

2. The switch cell of claim 1 wherein said multiphase ac electrical input signal is generated by a variable speed wind turbine.

3. A matrix converter for converting a multiphase ac electrical input signal to a multiphase ac electrical output signal comprising:

a switch matrix that connects a plurality of input legs of said matrix converter to a plurality of output legs of said matrix converter via switch branches;

a plurality of multilevel switch cells that generate a multilevel output voltage signal that is applied to said plurality of output legs of said matrix converter to substantially match the phase, frequency and output voltage level of said multiphase ac electrical output signal, said plurality of multilevel switch cells having a full bridge inverter with a capacitor connected between positive and negative nodes of said inverter, to produce said multilevel output voltage signal in response to said control signals;

a controller that generates said control signals by determining desired reference vectors for said multilevel output voltage signal and modulating between space vectors adjacent said desired reference vectors.

4. The matrix converter of claim 3 wherein said multiphase ac electrical input signal is generated by a variable speed wind turbine.

5. The matrix converter of claim 3 wherein said plurality of multilevel switch cells are serially connected in each of said switch branches so that the output voltage of said multilevel output voltage signal that is generated by said plurality of multilevel switch cells is reduced in magnitude.

6. The matrix converter of claim 3 wherein said full bridge inverter further comprises:

four inverter arms, each of said four inverter arms comprising a diode having a positive pole and a negative pole, and a transistor having a gate, an emitter and a collector, said emitter connected to said negative pole of said diode and said collector connected to said positive pole of said diode; a first of said four inverter arms being connected to a positive node of said full bridge inverter and to an input leg of said plurality of input legs, a second of said four inverter arms being connected to said positive node of said full bridge inverter and to an output leg of said plurality of output legs, a third of said four inverter arms being connected to a negative node of said full bridge inverter and to said input leg, and a fourth of said four inverter arms being connected to said negative node of said full bridge inverter and to said output leg;

a capacitor that is connected between said positive node of said full bridge inverter and said negative node of said full bridge inverter, that is charged to a dc voltage from said multiphase ac electrical input signal to produce said multilevel output voltage signal.

7. A matrix converter for converting a multiphase ac electrical input signal having a first set of voltage levels, frequencies, and phases to a multiphase ac electrical output signal having different voltage levels, frequencies, and phases, comprising:

a plurality of input legs of said matrix converter that conduct said multiphase ac electrical input signal to said matrix converter;

a plurality of output legs of said matrix converter that conduct said multiphase ac electrical output signal from said matrix converter;

a series connected inductor disposed in each of said plurality of input legs of said matrix converter that filter said multiphase ac electrical input signal;

a series connected inductor disposed in each of said plurality of output legs of said matrix converter that filter said multiphase ac electrical output signal; and a switch matrix that connects each of said plurality of input legs to each of said plurality of output legs via a plurality of switch branches, said switch matrix comprising:

a plurality of multilevel switch cells that generate a multilevel output voltage signal, from said multiphase ac electrical input signal, that is applied to said plurality of output legs of said matrix converter to substantially match said phase and said output voltage level of said ac electrical output signal on said plurality of output legs of said matrix converter, said multilevel switch cells being serially connected in each of said switch branches so that the output voltage of said multilevel output voltage signal that is generated by said plurality of multilevel switch cells is reduced in magnitude, said plurality of multilevel switch cells comprising:

a full bridge inverter that generates said multilevel output voltage signal in response to control signals, said full bridge inverter having four inverter arms, each of said four inverter arms comprising a diode having a positive pole and a negative pole, and a transistor having a gate, an emitter and a collector, said emitter connected to said negative pole of said diode and said collector connected to said positive pole c)f said diode, a first of said four inverter arms being connected to a positive node of said full bridge inverter and to an input leg of said plurality of input legs, a second of said four inverter arms being connected to said positive node of said full bridge inverter and to an output leg of said plurality of output legs, a third of said four inverter arms being connected to a negative node of said full bridge inverter and to said input leg, and a fourth of said four inverter arms being connected to said negative node of said full bridge inverter and to said output leg; and a capacitor, that is connected between said positive node of said full bridge inverter and said negative node of said full bridge inverter, that is charged to a dc voltage from said multiphase ac electrical input signal to produce said multilevel output voltage signal;

a controller that generates said control signals by determining a desired reference vector for said multilevel output voltage signal and modulating between space vectors adjacent said desired reference vector.

8. The matrix converter of claim 7 wherein said multiphase ac electrical input signal is generated by a variable speed wind turbine.

9. A method of converting a multiphase ac electrical input signal having a first set of voltages, frequencies and phases to a multiphase ac electrical output signal having different voltages, frequencies and phases comprising:

applying said multiphase ac electrical input signal to a plurality of input legs of a matrix converter;

connecting said plurality of input legs of said matrix converter to a plurality of output legs of said matrix converter via a plurality of switch branches;

generating a multilevel output voltage signal from said multiphase ac electrical input signal using at least one multilevel switch cell in each of said switch branches, said switch cells generating said multilevel output voltage signal using a full bridge inverter with a capacitor connected between positive and negative nodes of said inverter, to produce said multilevel output voltage signal in response to control signals; and generating said control signals by determining a desired reference vector for a desired output voltage of said multilevel output voltage signal and modulating between space vectors adjacent said desired reference vector.

10. The method of claim 9 wherein said process of generating said multilevel output voltage signal comprises using a full bridge inverter having four inverter arms, each of said four inverter arms comprising a diode having a positive pole and a negative pole, and a transistor having a gate, an emitter and a collector, said emitter connected to said negative pole of said diode and said collector connected to said positive pole of said diode, a first of said four inverter arms being connected to a positive node of said full bridge inverter and to an input leg of said plurality of input legs, a second of said four inverter arms being connected to said positive node of said full bridge inverter and to an output leg of said plurality of output legs, a third of said four inverter arms being connected to a negative node of said full bridge inverter and to said input leg, and a fourth of said four inverter arms being connected to said negative node of said full bridge inverter and to said output leg; and a capacitor, that is connected between said positive node of said full bridge inverter and said negative node of said full bridge inverter, that is charged to a dc voltage from said multiphase ac electrical input signal to produce said multilevel output voltage signal generated by each of said plurality of multilevel switch cells.

11. The method of claim 9 wherein said process of generating a multilevel output signal comprises using a plurality of serially connected multilevel switch cells in each of said switch branches to reduce the magnitude of said multilevel output voltage signal on each of said serially connected multilevel switch cells.

12. A method of converting a multiphase ac electrical input signal to a multiphase ac electrical output signal comprising:

applying said multiphase ac electrical input signal to a plurality of input legs of a matrix converter;

filtering said multiphase ac electrical input signal with a series connected inductor disposed in each of said plurality of input legs;

connecting said plurality of input legs to a plurality of output legs of said matrix converter via a plurality of switch branches using a switch matrix;

generating a multilevel output voltage signal from said multiphase ac electrical input signal using a plurality of serially connected multilevel switch cells in each of said switch branches to reduce the magnitude of said multilevel output voltage signal on each of said multilevel switch cells, said switch cells generating said multilevel output voltage signal using a full bridge inverter that generates said multilevel output voltage signal in response to control signals, said full bridge inverter having four inverter arms, each of said four inverter arms comprising a diode having a positive pole and a negative pole, and a transistor having a gate, an emitter and a collector, said emitter connected to said negative pole of said diode and said collector connected to said positive pole of said diode, a first of said four inverter arms being connected to a positive node of said full bridge inverter and to an input leg of said plurality of input legs, a second of said four inverter arms being connected to said positive node of said full bridge inverter and to an output leg of said plurality of output legs, a third of said four inverter arms being connected to a negative node of said full bridge inverter and to said input leg, and a fourth of said four inverter arms being connected to said negative node of said full bridge inverter and to said output leg, and a capacitor connected between said positive node of said full bridge inverter and said negative node of said full bridge inverter that is charged to a dc voltage from said multiphase ac electrical input signal to produce said multilevel output voltage on each of said plurality of multilevel switch cells that is applied to said plurality of output legs;

generating said control signals by determining desired reference vectors for said multilevel output voltage signal and modulating between space vectors adjacent said desired reference vectors;

filtering said multilevel output voltage of each of said plurality of multilevel switch cells using a series connected inductor in each of said plurality of output legs to produce said multiphase ac electrical output signal.

* * * * *